US011859412B2

(12) United States Patent

Favier

(10) Patent No.: US 11,859,412 B2
(45) Date of Patent: Jan. 2, 2024

(54) CALIBRATABLE LOCK EAS TAG

(71) Applicant: All-Tag Corporation, Boca Raton, FL (US)

(72) Inventor: Alain Favier, Paris (FR)

(73) Assignee: All-Tag Corporation, Boca Raton, FL (US)

( * ) Notice: Subject to any disclaimer, the term of this patent is extended or adjusted under 35 U.S.C. 154(b) by 428 days.

(21) Appl. No.: 17/199,007

(22) Filed: Mar. 11, 2021

(65) Prior Publication Data

US 2021/0285263 A1 Sep. 16, 2021

Related U.S. Application Data

(60) Provisional application No. 62/988,531, filed on Mar. 12, 2020.

(51) Int. Cl.
*E05B 73/00* (2006.01)

(52) U.S. Cl.
CPC ................................ *E05B 73/0052* (2013.01)

(58) Field of Classification Search
CPC ......................... E05B 73/0052; Y10T 70/5004
USPC ........................................................ 70/57.1
See application file for complete search history.

(56) References Cited

U.S. PATENT DOCUMENTS

| | | | | | |
|---|---|---|---|---|---|
| 3,858,280 | A | 1/1975 | Martens | | |
| 5,572,191 | A * | 11/1996 | Lundberg | G08B 13/2434 | 70/57.1 |
| 6,084,498 | A | 7/2000 | Stelter et al. | | |
| 7,724,146 | B2 * | 5/2010 | Nguyen | E05B 73/0017 | 70/57.1 |
| 2007/0096925 | A1 * | 5/2007 | Yang | G08B 13/2434 | 340/572.9 |

* cited by examiner

*Primary Examiner* — Suzanne L Barrett
(74) *Attorney, Agent, or Firm* — Breiner & Breiner, L.L.C.

(57) ABSTRACT

There is disclosed a high Gauss magnetic lock comprising at least one high grade steel ball-bearing but typically 3 or 4 ball bearings, one generally non-ferrous ball basket that will carry and hold in a specific position the ball-bearing(s), at least one non-ferrous spring, one ferrous calibrating high precision element, and one generally non-ferrous and conical ball cage where the ball basket will evolve up and down pushed by the spring and pulled down by a magnetic field.

16 Claims, 9 Drawing Sheets

Section A-A

70>80>30

70>80>30

70>80>30

CALIBRATABLE LOCK EAS TAG

RELATED APPLICATION

This application claims benefit of U.S. Provisional Application Ser. No. 62/988,531, filed Mar. 12, 2020, entitled "Calibratable Lock EAS Tag," which application is incorporated herein by reference in its entirety.

FIELD OF THE INVENTION

The present invention relates to an improved lock device for electronic article surveillance (EAS) tags. More particularly, the invention relates to an improved calibratable magnetic release lock particularly suited to be used with EAS antitheft tags with high Gauss locks to prevent the unauthorized removal of soft goods articles sold in department stores, boutiques, sporting goods stores, lingerie stores and the like requiring a high Gauss magnet to be released.

BACKGROUND OF THE INVENTION

Magnetic release locks such as the one related to this invention are generally known in the art, including in U.S. Pat. No. 3,858,280 which is incorporated herein by reference in its entirety. Since the advent of magnetic release EAS tags in the 1970s, retailers have used billions of them in order to prevent shoplifting. Such tags are removed at the checkout point using magnetic detachers ("Detacher") which generate a magnetic flux from one or a plurality of permanent magnets that will attract ferro-magnetic parts inside the lock which result in releasing the tags from protected soft goods such as, but not limited to, clothing goods.

The power of a Detacher magnetic flux has continued to increase from about 4,000 Gauss in the 1970s to over 12,000 Gauss in the 1990s and to over 14,000 Gauss in the 2010s. For example, U.S. Pat. No. 6,084,498 discloses a magnet assembly used for a Detacher using a plurality of neodymium magnets and which is incorporated herein by reference in its entirety. Over the years, EAS tag manufacturers have designed tags having magnetic locks that require stronger and stronger magnetic fluxes to provide stronger locks in order to stop shoplifters who periodically learn how to defeat older generation EAS tags and Detachers. Historically, every time a new magnetic release tag hits the market needing a stronger magnetic flux Detacher than the previous generation, shoplifters find ways to purchase them after a few years as the magnets used in the latest magnetic Detachers generation become available online either from e-stores selling Detachers from retailers that go out of business or by assembling at home magnets available in retail specialty stores.

Magnetic release locks used in tags requiring a magnetic flux of up to 12,000 Gauss have been generally constructed for the past 35 years using 3 to 4 ball bearings, a magnetic ball basket to hold the ball bearings in place, a magnetic conical shape ball cage where the ball basket will evolve from a locked to a released position, a ferro-magnetic spring to push the ball basket upwards inside the ball cage pushing the ball bearings against the ball cage walls and a metal tack having gone through a soft textile good to maintain the tag in a locked position whereas the tag with its lock are on one side of the soft good and the metal tack with a round metal head on the opposite side.

Magnetic release locks built as detailed above having a high quantity of ferro-magnetic material requiring a magnetic flux of over 12,000 Gauss present draw backs as the tags using the above-mentioned locks are very difficult to be removed from a Detacher surface after having been released as they get stuck to the Detacher surface needing extra force from the checkout clerk's hands to be removed which collaterally damage sensitive fabrics as the tags are violently attracted to the Detacher surface as of a detaching magnetic flux of 14,500 Gauss causing extra tension on the textile item in sandwich between the tag and the tag's shank.

To solve the above-mentioned drawback a French Company, Exaqtworld, developed in the late 2000s an improved magnetic lock for a tag commercially sold as DURALTAG™ that would only have the ball-bearings and the spring as ferro-magnetic parts. All other parts being non-ferro-magnetic including the tag's shank. This improved lock would no longer be violently pulled by a high Gauss Detacher, thus no longer damaging sensitive fibers upon removal of the DURALTAGs™.

However, the Exaqtworld improved magnetic lock presents at least the following drawbacks:

1. In the DURALTAG™ lock the ferro-magnetic spring represents about 60% of the total ferro-magnetic force and the ball bearings represent about the 40% balance that is to be attracted by a strong magnetic field Detacher of about 14,500 Gauss or more as shown in the following table:

| Ferro-magnetic forces in DURALTAG Lock | | | |
|---|---|---|---|
| | Newton (N) | Percentage | Tolerance |
| 4 ball bearings | 2.8 | 40% | <1% |
| Ferrous spring | 4.2 | 60% | ~15% |
| Total | 7.0 | 100% | |

The spring force of the DURALTAG™ ferro-magnetic spring is not accurate having about a +/−15% tolerance which adds to a tolerance of about +/−5% in the magnetic flux of a strong Gauss Detacher and does not allow the lock to take full advantage of the maximum flux of the magnetic Detacher it was designed for. This drawback will allow, as an example, a certain number of the DURALTAGs™ designed to release with a 14,500 Gauss to overlap and be released by lower power magnetic Detacher of 12,000 Gauss which are readily available on-line for a shoplifter if one factors that the spring force in the lock is at its lower end tolerance of −15%; and the 12,000 Gauss Detacher is at its top tolerance of +5.

The above-mentioned drawback cannot guarantee a DURALTAG™ customer buying a DURALTAG™ rated at 14,500 locks requiring a magnetic field of 14,500 Gauss that they will not release with a lower power magnetic Detacher rated at 12,000 Gauss, one easily purchased online by a shoplifter.

In a real industrial environment, it is impossible to accurately test all ferro-magnetic springs to lower the tolerance issue as manipulating them to measure them will change their spring load specifications. Therefore, this is a huge drawback.

2. When the lock of a DURALTAG™ is submitted to very high Gauss Detachers having an annular magnet on their surface that reach about 17,000 Gauss and over, using the U.S. Pat. No. 6,084,498, the moment the DURALTAG™ enters the magnetic field of the annular magnet before making physical contact with the Detacher magnet surface, i.e. the nesting area, the ferro-magnetic springs often bends instead of vertically contracting thus making it hard to release the DURALTAG™ at the checkout point. The checkout clerk, therefore, will need to wiggle the DURALTAG™ once inside the Detacher or create a swing movement on the Detacher in order to have the spring retract and release, thereby becoming a nuisance for a checkout clerk and thereby losing time in checking out a customer. This wiggling and swinging will also stress sensitive fabrics around the shank and possibly cause damage to the soft goods.

In summary the Exaqtworld lock is a good solution for high Gauss magnets locks to combat shoplifting of soft goods from clothing stores such as department stores, boutiques, sporting goods stores, lingerie stores and the like but presents drawbacks creating nuisances and security risks to retailers. These and other shortcomings of the known high Gauss magnetic release locks for tags are addressed by the present invention.

SUMMARY OF THE INVENTION

In order to solve the above challenges with current high Gauss magnetic locks, the invention is directed to an improved high Gauss magnetic lock made of at least two steel ball bearings, one plastic ball basket generally made of polyacetal polyoxymethylene (POM) to house the steel ball bearings, one non-magnetic conical ball cage generally made of a Zamak metal which is generally nickel plated, one non-ferrous spring of an alloy such as phosphor bronze used to push upwards the ball basket inside the ball cage and one ferro-magnetic element such as, but not limited to, a steel washer with very low magnetic tolerances to precisely calibrate the total ferro-magnetic traction force with great accuracy which is perfectly suited to equip high security new generation tags needing a very high Gauss Detacher of over 14,500 Gauss to be released and which may also be used in lower Gauss Detachers. The tag design described herein is a presently preferred embodiment of the invention, but is not limited thereto. This improved high Gauss magnetic lock could also be used for locking and unlocking other devices in or out of the EAS market. High Gauss Detacher is used herein to mean a Detacher having a Gauss valve of about 12,000 or greater.

By replacing the ferro-magnetic spring, which is inaccurate in the prior art locks, with a non-ferrous spring generally made of phosphor bronze will eliminate the about 60% participation of the ferro-magnetic spring on the total pull out force, thereby, eliminating the drawbacks previously stated, namely, the lock release overlapping with similar strength magnetic EAS Detachers; and the ferro-magnetic spring bending during the removal process.

However, replacing the ferrous spring by a non-ferrous spring in a high Gauss magnetic lock will have a counter effect which is not providing enough ferro-magnetic force to be attracted by the magnetic flux or field of a high Gauss Detacher for successfully unlocking. Therefore, an additional ferro-magnetic element is added such as, but not limited to, a metal washer to be placed under the POM ball-basket in contact with the non-ferrous spring, i.e. in sandwich between the lower part of the ball-basket and the upper section of the spring.

The following table depicts the ferro-magnetic forces of the improved calibratable high Gauss lock using a non-ferrous spring:

Ferro-magnetic forces

| | Newton (N) | Percentage | Tolerance |
|---|---|---|---|
| 4 ball bearings | 2.8 | 100% | <1% |
| Non-ferrous spring* | 5.0 to 7.0 | 0% | |
| Total | 2.8 | 100% | |

*The value of the spring will be determined by the Gauss value of the magnetic Detacher and the amount of ferro-magnetic material of the calibration washer. For instance, with a very high Gauss Detacher of about 17,000 Gauss and about 10,000 Gauss at the height (11 mm) of the ball bearings in the locked position, the dimentions of the steel calibration washer made of steel type S235 JR will be of: diameter 5.5 mm for the lock to be successfully released. If it were to be unlocked by a weaker magnetic Detacher the steel washer would need to be thicker to compensate for a weaker magnetic attraction force.

A primary object of the present invention is to provide an improved high Gauss magnetic lock for, but not limited to, EAS tags that is easily and precisely calibratable to take full advantage of the magnetic field of a specific magnetic Detacher, whereas the tolerance of the ferro-magnetic spring will no longer enter into account thus avoiding overlapping.

Another primary object of the present invention is to provide an improved high Gauss magnetic lock for EAS tags that will prevent the need by a checkout clerk to wiggle or move back and forth the EAS tag within a high Gauss magnetic Detacher to allow the ferro-magnetic spring to fully contract which has a tendency to bend instead of contracting the moment it enters a very strong magnetic field generated by a high Gauss magnetic Detacher of over 14,000 Gauss.

Another primary object of the present invention is to provide an improved high Gauss magnetic lock for EAS tags that will have the lowest ferro-magnetic content to minimize the pull-force needed by a checkout clerk to remove an EAS tag from the attraction field of a high Gauss magnetic Detacher after having released the lock and removed the shank from a soft good.

The present invention is directed to an improved high Gauss magnetic lock comprising:

1. At least two high grade steel ball-bearings but typically 3 or 4 ball bearings;
2. One generally non-ferrous ball basket that will carry and hold in a specific position the ball-bearing(s);
3. At least one non-ferrous spring;
4. One ferrous calibrating high precision element; and
5. One generally non-ferrous and conical ball cage where the ball basket will evolve up and down pushed by the spring and pulled down by a magnetic field.

A variant of the present invention may comprise:

1. At least two high grade steel ball-bearings but typically 3 or 4 ball bearings;
2. One generally ferrous ball basket that will carry and hold in a specific position the ball-bearing(s) whereas the total amount of ferro-magnetic content will be the calibrating element;
3. One non-ferrous spring; and
4. One generally non-ferrous and conical ball cage where the ball basket will move up and down pushed by the spring and pulled down by a magnetic field.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings.

DETAILED DESCRIPTION OF THE PREFERRED EMBODIMENTS

Figure 1:
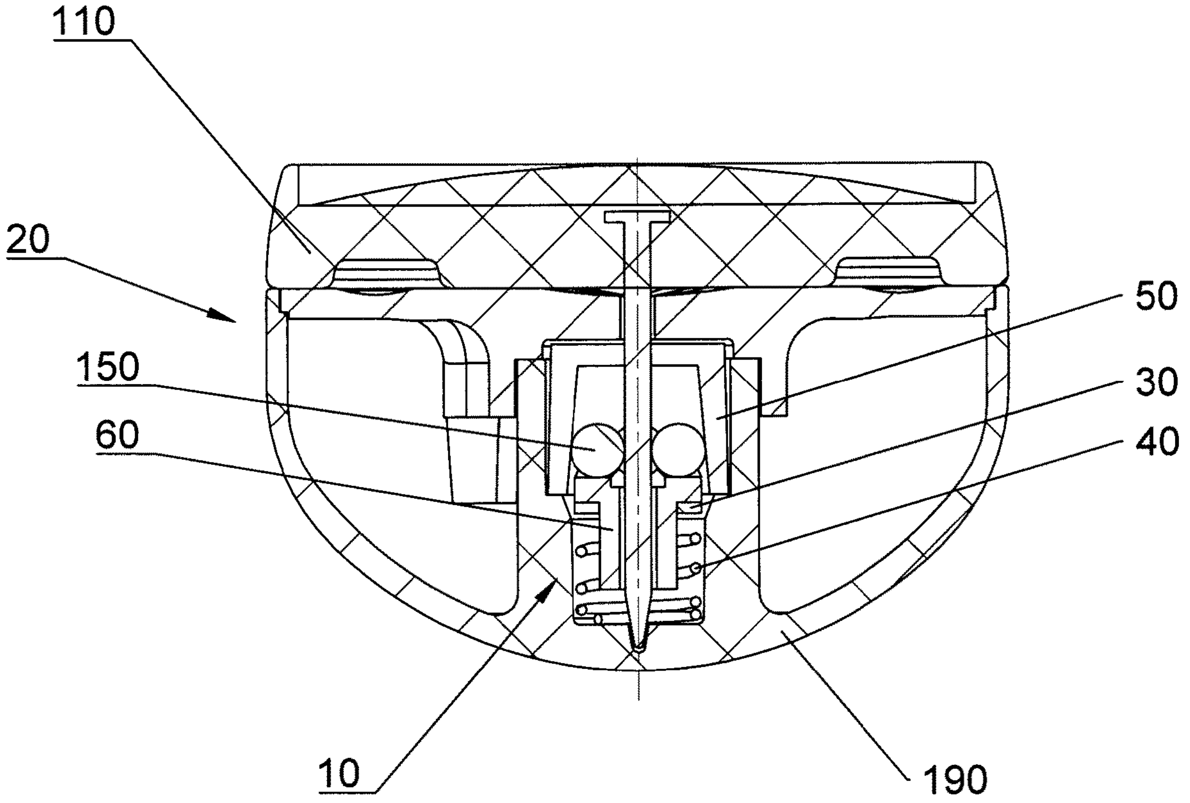
FIG. 1 is a front view of the improved calibratable high Gauss lock inside an EAS tag.

Referring to FIG. 1, there is shown the improved calibratable high Gauss lock 10 comprising a Zamak metal conical ball cage 50, a ball basket 60 made of polyacetal POM where the ball bearings 150 are mounted which are pushed upwards by the force of a non-ferrous spring 40 which can be made of phosphor bronze and pulled down when pulled by the ferro-magnetic material composed of the ball bearings 150 and the calibratable washer 30 that can be made of high grade low magnetic tolerance steel such as steel type S235JR or a similar material. The lock is depicted inside a specific EAS tag 20 having an EAS security element but may also fit inside another EAS tag or device which needs to be locked and/or unlocked.

Figure 2:
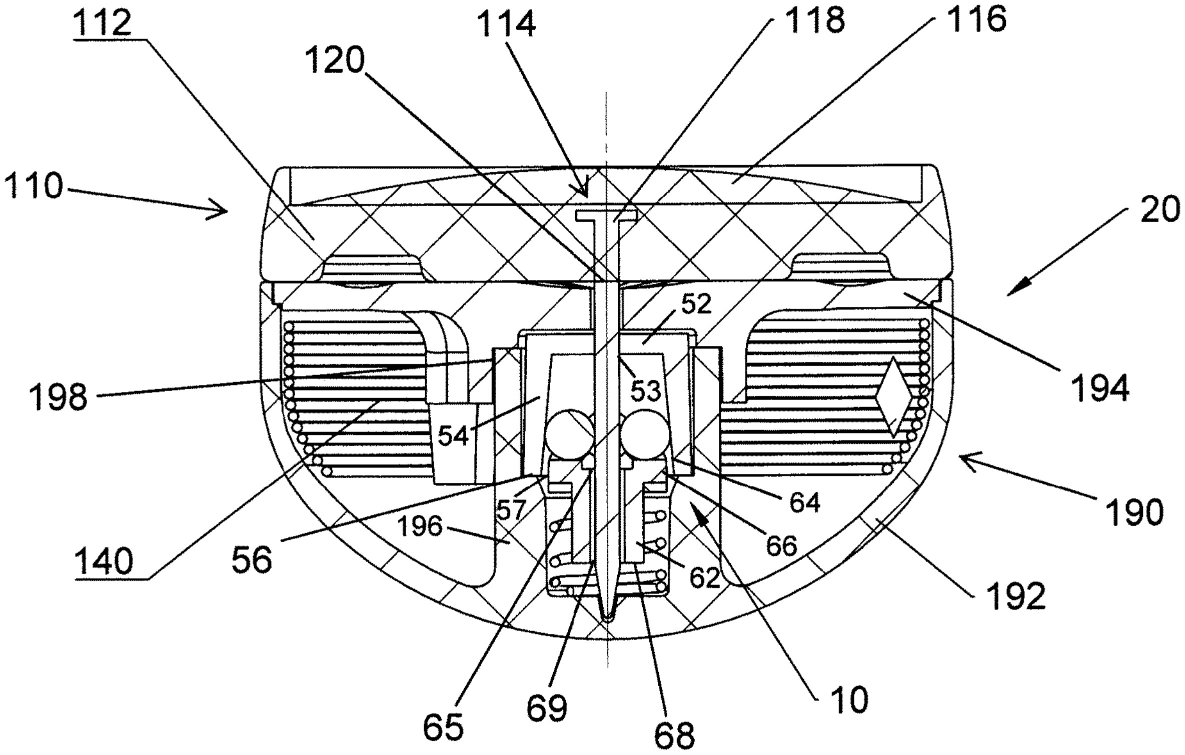
FIG. 2 is a front view of the improved calibratable high Gauss lock inside an EAS tag with a resonant circuit.

FIG. 2 shows a presently preferred embodiment of an EAS tag 20 comprised of a plastic pin 110 and a plastic body 190 of the tag containing the improved calibratable high Gauss lock 10. The plastic pin 110 includes a plastic body 112, a pin 114 and a plastic dome 116. The pin 114 has a shoulder 118 connected to body 112 and a shank 120. Plastic dome 116 may carry a pre-printed commercial message such as a logo or a QR code with no protective transparent window. The housing 190 includes the conical ball cage 50, the ball basket 60, the ball bearings 150, the non-ferrous spring 40, and the calibratable washer 30 as referred to in FIG. 1. The housing body is preferably fully enclosed and includes a base 192 and a top 194. Base 192 includes an upwardly extending annular wall 196 for connecting to and holding lock 10. Top 194 includes a downwardly extending annular leg 198 for connecting to wall 196, thereby holding lock 10 in place.

The conical ball cage 50 may be made of a Zamak metal or a similar non-magnetic metal. The ball cage 50 has a conical shape with a top wall 52, side wall 54 and bottom wall 56. Side wall 54 is tapered on an inside surface to stop upward movement of ball basket 60. The top wall 52 has an opening 53 for receiving the shank 120 of pin 114 and an opening 57 to engage the ball basket 60, thereby retaining ball bearings 150.

The ball basket 60 may be made of POM or a similar plastic or other non-magnetic material. The ball basket is annular with a side wall 62 with a top wall 64 having a shoulder 66 and a bottom wall 68. The top wall 64 has an opening 65 and bottom wall 68 has an opening 69. Shoulder 66 fits in opening 57 and may move upward on sidewall 54 a certain distance such that ball bearings 150 engage pin shank 120 to secure the EAS tag to merchandise.

In a preferred embodiment, there are four ball bearings 150, one not being shown in the Figures based on the cross-sectional view. The ball bearings are made of a magnetic metal. It is understood that a different number of ball bearings may be used without departing from the scope of the invention.

There is a resonant device 140 that receives and/or emits radio signals. The resonant device may include, but is not limited to, any of an EAS label; an antenna; or a security device or electronic label such as an RFID element/antenna for the purpose such as, but not limited to, one or multiple traceability, merchandising, marketing, pricing or inventory purposes.

Figure 3:
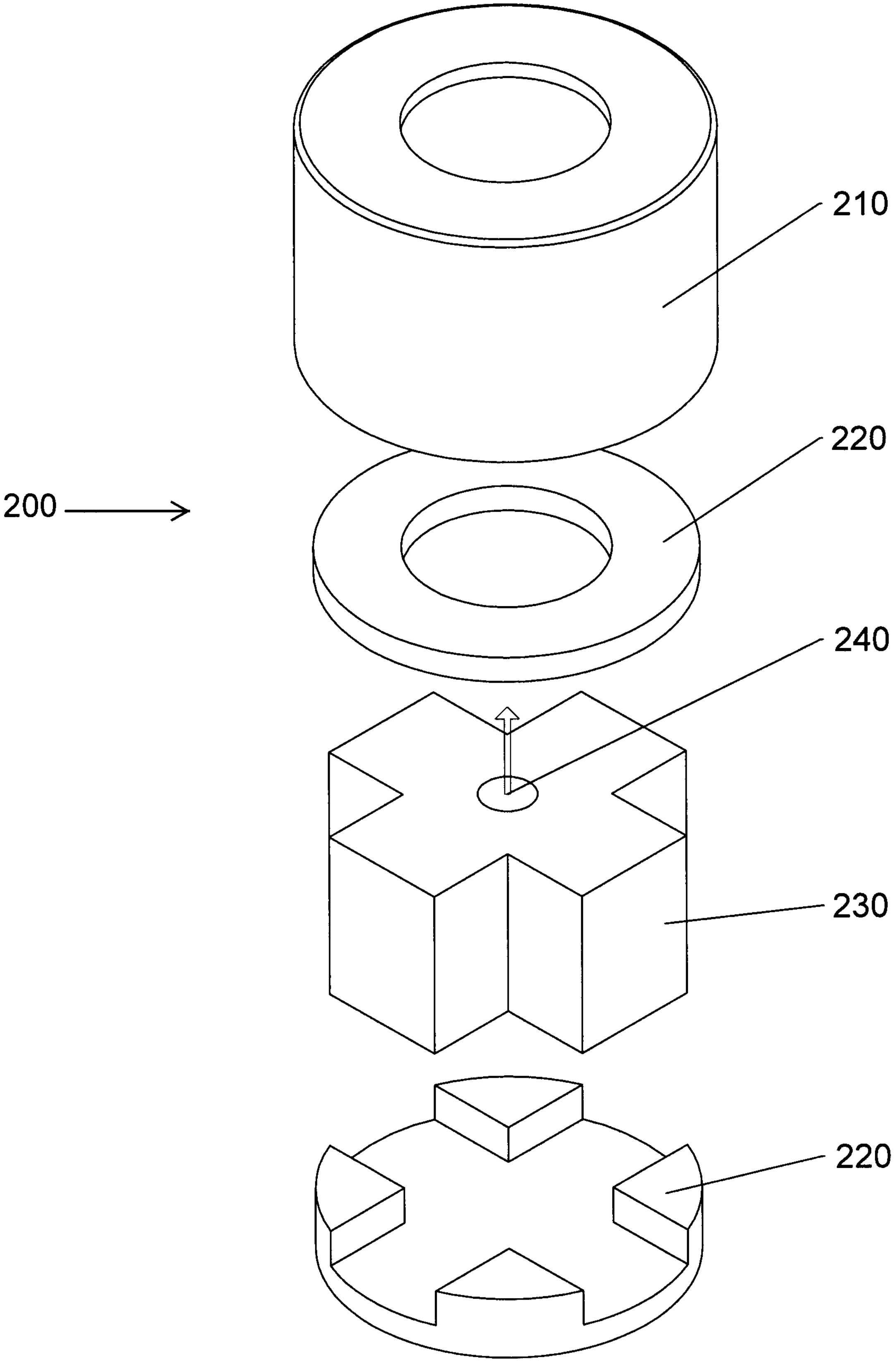
FIG. 3 is an exploded front view of a high Gauss Detacher.

Referring to FIG. 3, there is shown an exploded view of a high Gauss magnetic Detacher 200 such as described in U.S. Pat. No. 6,084,498 comprising a plastic housing 210 which may be made of ABS plastic, an annular neodymium high grade magnet 220, a magnetic assembly of neodymium magnets 230 comprising at least two magnets, and a metallic base 220 which can be made of iron to contain the magnetic field. There is also shown the nesting area or spot 240 on the magnet assembly's surface where the EAS tags rest to be released.

Figure 4A:
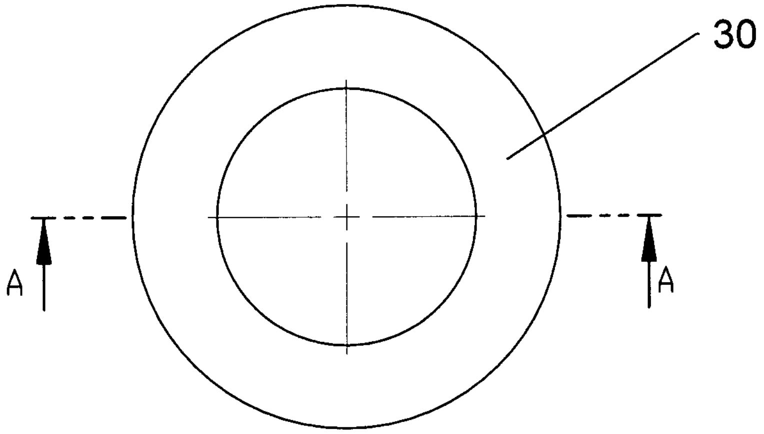
FIG. 4A is a top view of the calibratable washer and FIG. 4B is a sectional view of the calibratable washer taken along line A-A of FIG. 4A.
Figure 4B:
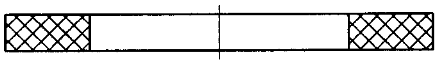

Referring to FIGS. 4A and 4B, there is shown in FIG. 4A a metal washer 30 used in the improved calibratable high Gauss lock as the calibrating element to interact with different Detachers that generate different Gauss values on their spot. FIG. 4B shows a cross-section of metal washer 30 taken along line A-A of FIG. 4A. In a preferred embodiment the metal washer is made of steel type S235JR. The thickness of the washer may be varied to calibrate the magnetic force needed to remove the body 190 from pin 110 by detacher 200.

Figure 5:
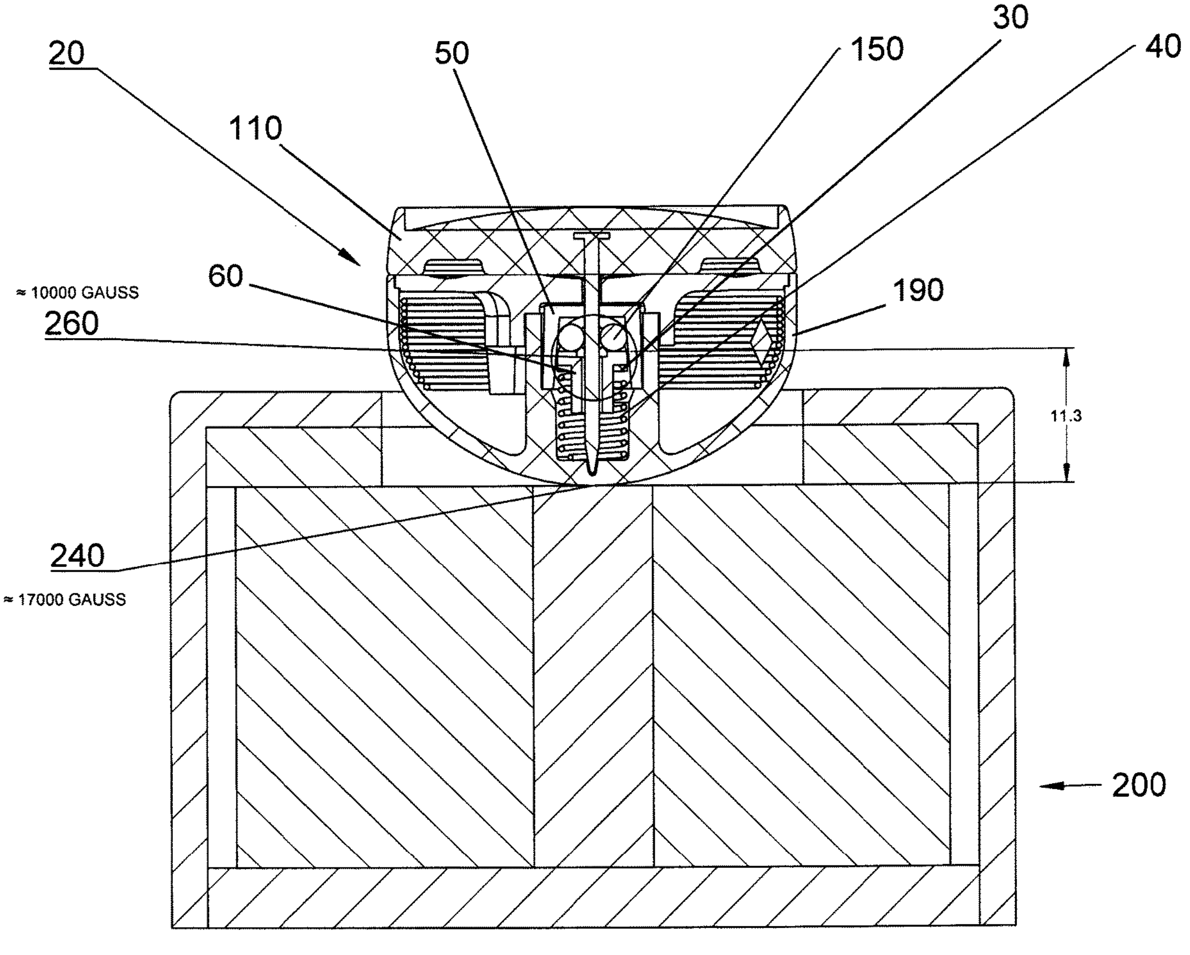
FIG. 5 is a front view representation of an EAS tag with the improved calibratable high Gauss lock inside an EAS tag resting on a high Gauss Detacher.

FIG. 5 shows the EAS tag 20 of FIG. 2 sitting on the nesting area 240 of a magnetic Detacher 200 with a Gauss value of about 17,000 Gauss on its nesting area 240 and about 10,000 Gauss at the height 260 where the ferro-magnetic parts of the improved calibratable high Gauss lock 10 are located: ball bearings 150 and the calibratable washer 30 which are about 11 mm from the spot 240. The detacher 200 through the magnetic attraction to, the ball bearings 150 and washer 30 will cause the non-ferrous spring 40 to compress by pulling ball basket 60 downward thereby releasing ball bearings 150 from engagement with pin 110 and allowing the removal of pin 110 from body 190.

Figure 6A:
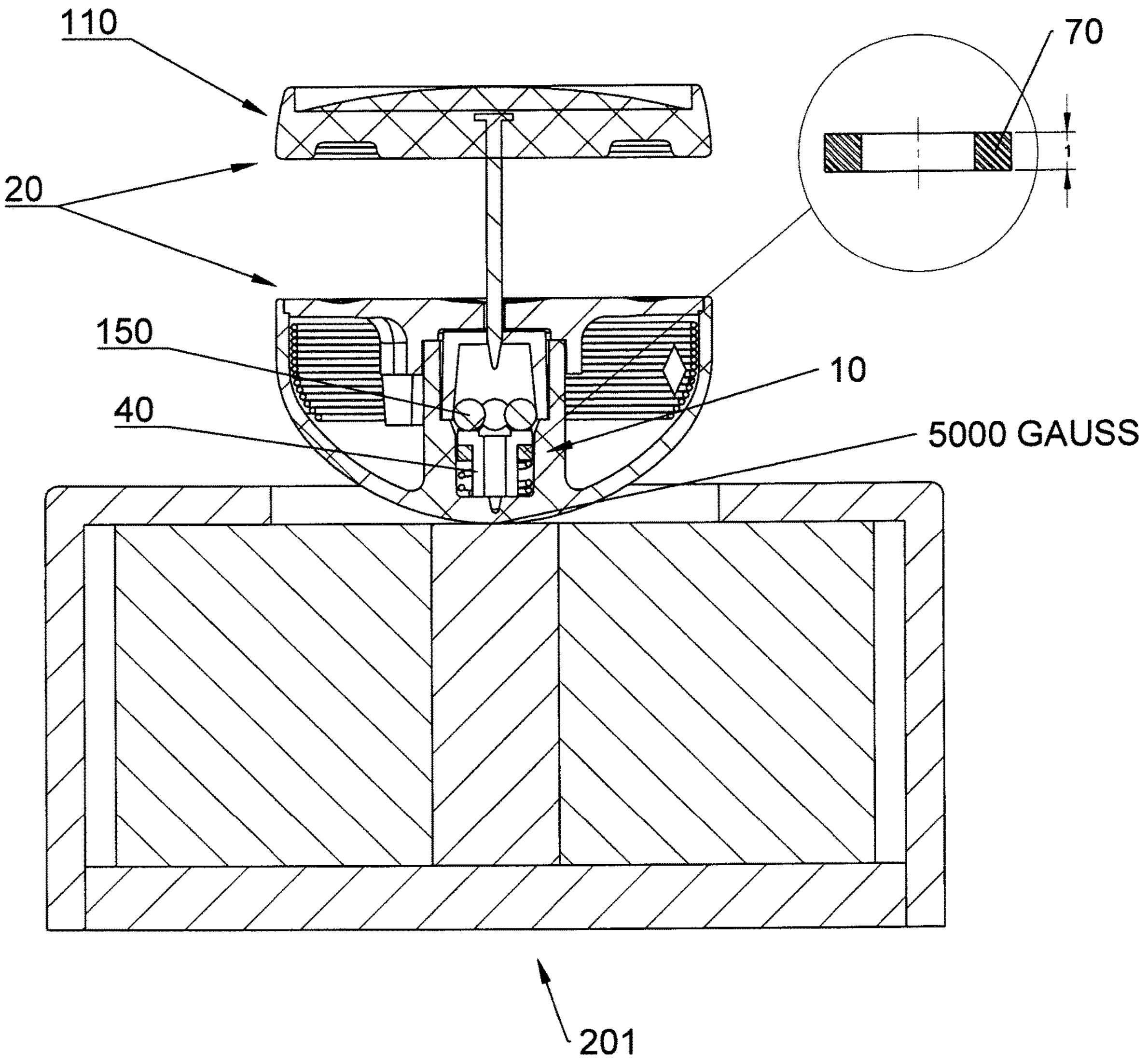
FIGS. 6A-6C show a front representation of three Detachers having three different magnetic fluxes detaching three improved calibratable high Gauss locks inside an EAS tag with three different calibrating elements.
Figure 6B:
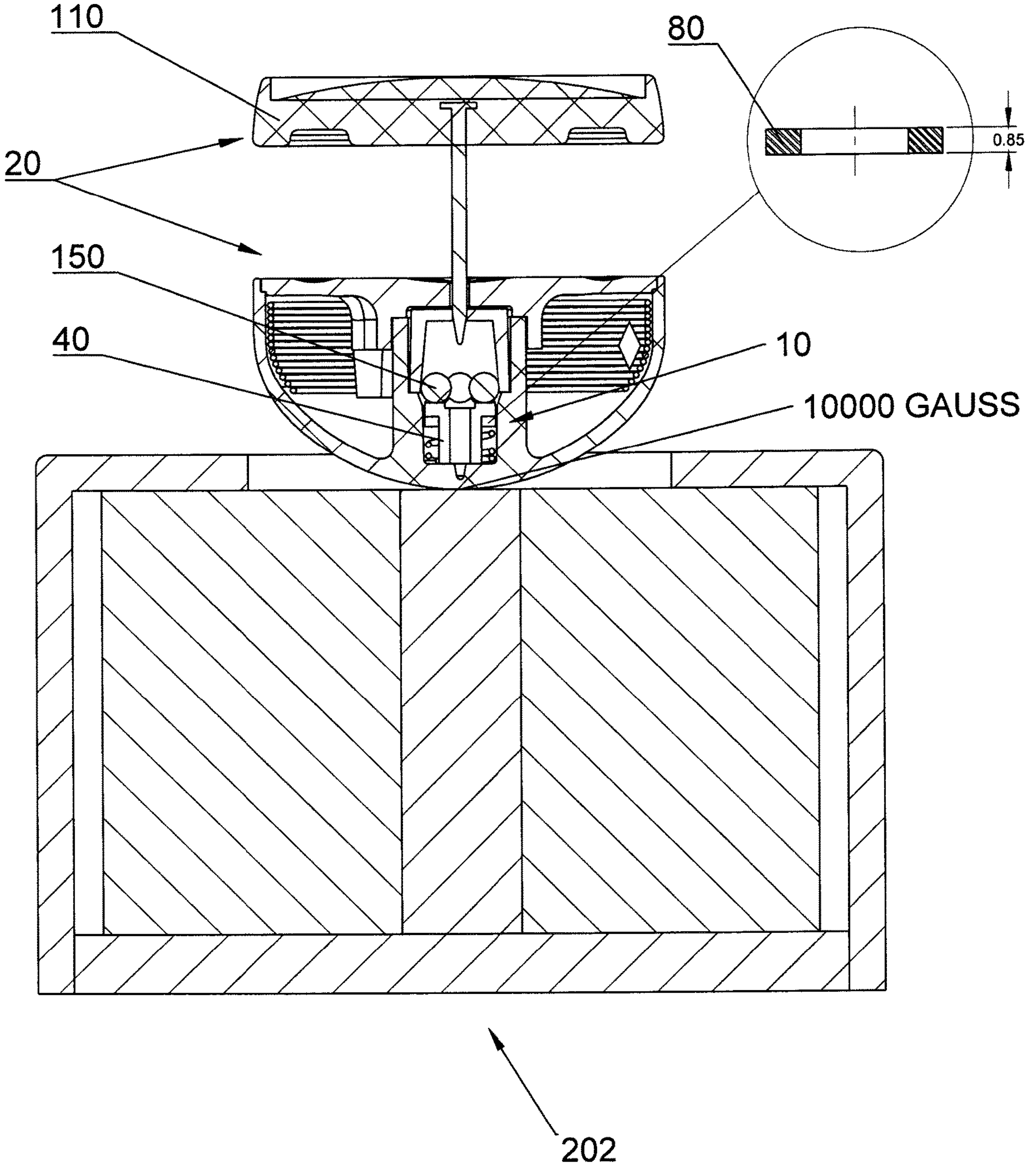
Figure 6C:
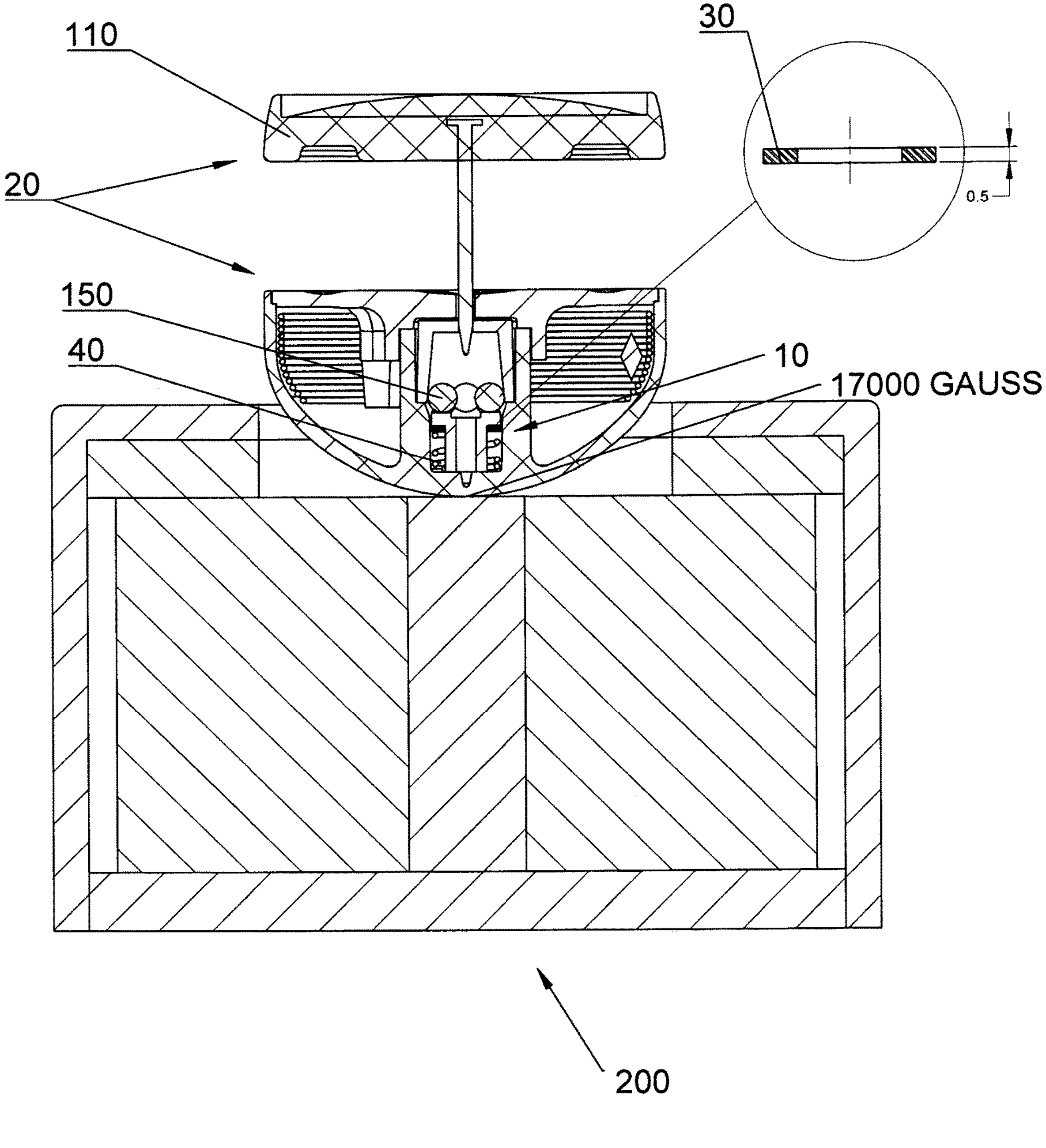

FIGS. 6A-6C represent the same EAS tag 20 shown in FIG. 5 with the same new improved calibratable high Gauss lock 10, the same ball bearings 150, the same spring 40 and three different metal washers 70, 80 and 30 wherein the thickness of washer 70 is thicker than washer 80 which is thicker than washer 30 to interact and release the pin 110 respectively with Gauss values of 5,000 by detacher 201 in FIG. 6A; 10,000 by detacher 202 in FIG. 6B and 17,000 Gauss by detacher 200 in FIG. 6C on each Detacher's nesting area. More specifically, washer 70 has a thickness of 1 mm; washer 80 has a thickness of 0.85 mm; and washer 30 has a thickness of 0.5 mm.

Figure 7A:
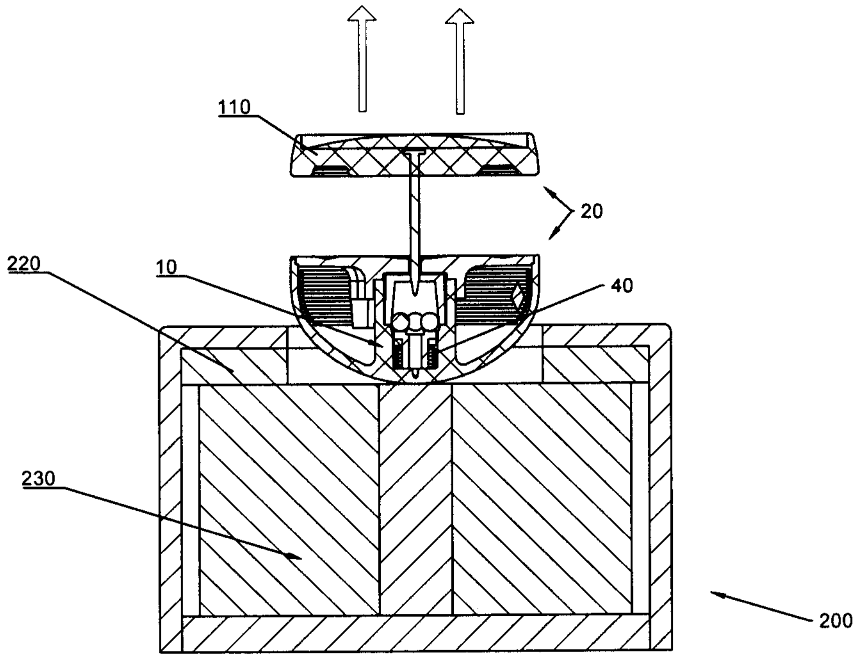
FIG. 7A-7B represent a front view of the same tags of FIGS. 6A-6C on the nesting area of the same high Gauss Detacher, except that the tag of FIG. 7B uses a ferrous-spring and does not release properly.
Figure 7B:
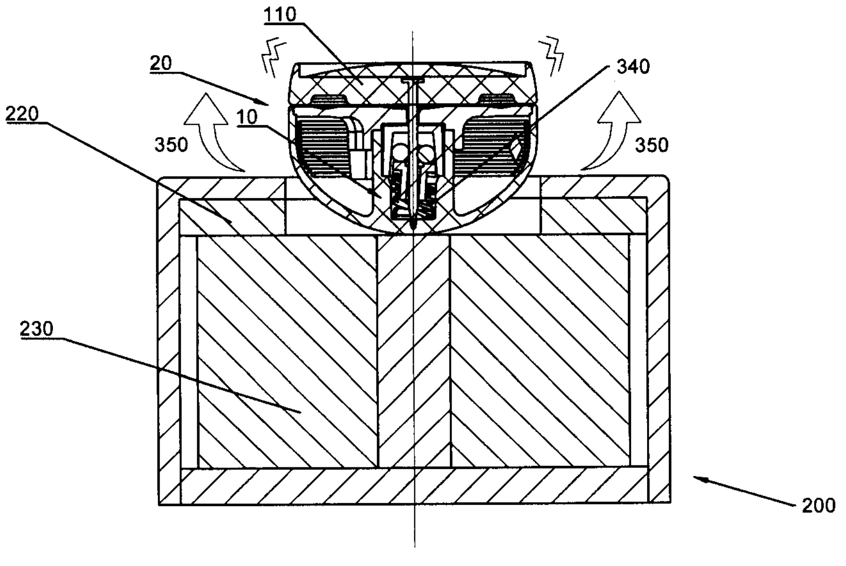

FIGS. 7A and 7B represent a front view of the same tag 20 of FIG. 5 (except as noted below) on the nesting area of the same high Gauss lock Detacher 200 whereas the non-ferrous spring 40 of lock 10 retracts normally to release the pin 110 in FIG. 7A. FIG. 7B represents the same tag 20 of FIGS. 5 and 7A, except that the non-ferrous spring 40 has been replaced with a ferrous spring 340 that bends, thereby preventing the pin 110 from being released without moving the tag 20 in a back and forth motion 350 until the ferrous spring retracts properly.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. For example, the shape of the ball cage 50, ball basket 60 and calibratable metal washer may vary or the EAS security element may be in the plastic pin. Such modifications being within the ability of one skilled in the art form a part of the present invention and are embraced by the appended claims.

It is claimed:

1. An electronic article surveillance (EAS) tag for use with a high Gauss detacher comprising a plastic pin member having a body member and a pin extending therefrom and adapted to be attached to a plastic body member to secure an article, the plastic body member having a base and a top and adapted to receive the pin member to secure the article, wherein the improvement comprises a lock for releasing the pin member from the body member by the high Gauss detacher, the lock comprising at least two ball bearings and a low magnetic tolerance ferro-magnetic material, the EAS tag having no other ferro-magnetic components other than the at least two ball bearings and the low magnetic tolerance ferro-magnetic material, and wherein the lock may be calibrated by using different low magnetic tolerance ferro-magnetic materials.

2. The EAS tag of claim 1 wherein the low magnetic tolerance ferro-magnetic material comprises a washer.

3. The EAS tag of claim 2 wherein the washer is made of steel.

4. The EAS tag of claim 3 wherein the steel is steel type S235JR.

5. The EAS tag of claim 1 further comprising a conical ball cage made of a Zamak metal, a ball basket made of a polyacetal and a non-ferrous spring.

6. The EAS tag of claim 5 wherein the non-ferrous spring is made of phosphor bronze.

7. The EAS tag of claim 1 wherein the base and the top of the plastic body member include means for receiving the lock.

8. The EAS tag of claim 1 wherein the high Gauss detacher has a Gauss value greater than 12,000 Gauss.

9. The EAS tag of claim 1 wherein the low magnetic tolerance ferro-magnetic material comprises a ferrous ball basket.

10. A calibratable high Gauss lock for use with a high Gauss detacher comprising a ball cage made of a non-ferrous material, a ball basket made of a non-ferrous material, at least two ball bearings mounted in the ball basket and ball cage, a non-ferrous spring and a washer made of low magnetic tolerance steel, wherein the magnetic flux of the high Gauss detacher is adapted to engage the at least one ball bearing and the washer, wherein the lock may be calibrated by using different size washers.

11. The calibratable high Gauss lock of claim 10 wherein the ball cage is made a Zamak metal.

12. The calibratable high Gauss lock of claim 10 wherein the ball basket is made of polyacetal.

13. The calibratable high Gauss lock of claim 10 wherein the non-ferrous spring is made of phosphor bronze.

14. The calibratable high Gauss lock of claim 10 wherein the ball cage is made a Zamak metal, the ball basket is made of polyacetal and the non-ferrous spring is made of phosphor bronze.

15. The EAS tag of claim 1 further comprising a resonant device selected from the group consisting of an EAS label, an antenna, an RFID element/antenna or a combination thereof.

16. The calibratable high Gauss lock of claim 10 further comprising a resonant device selected from the group consisting of an EAS label, an antenna, an RFID element/antenna or a combination thereof.

* * * * *